United States Patent [19]

Miyakoshi

[11] Patent Number: 5,547,773
[45] Date of Patent: Aug. 20, 1996

[54] MAGNETOOPTIC RECORDING MEDIUM

[75] Inventor: Toshimori Miyakoshi, Kasukabe, Japan

[73] Assignee: Canon Kabushiki Kaisha, Tokyo, Japan

[21] Appl. No.: 914,589

[22] Filed: Jul. 20, 1992

[30] Foreign Application Priority Data

Jul. 23, 1991 [JP] Japan ................................. 3-182507

[51] Int. Cl.$^6$ ....................................................... G11B 5/66
[52] U.S. Cl. ........................... 428/634 ML; 428/634 SC; 428/634 DE; 428/634 RE; 428/634 NF; 428/634 RL; 428/634 MM; 428/634 EC; 428/900; 365/122; 363/13
[58] Field of Search ..................... 428/694, 900, 428/634 ML, 634 SC, 634 DE, 634 RE, 634 NF, 634 RL, 634 MM, 634 EC, 336; 365/122; 363/13

[56] References Cited

U.S. PATENT DOCUMENTS

| | | | |
|---|---|---|---|
| 4,628,485 | 12/1986 | Tanaka et al. | 365/122 |
| 4,753,853 | 6/1988 | Sato et al. | 428/679 |
| 4,799,114 | 1/1989 | Tsunashima | 360/59 |
| 4,842,956 | 6/1989 | Kobayashi | 428/611 |
| 4,855,975 | 8/1989 | Akasaka et al. | 369/13 |

FOREIGN PATENT DOCUMENTS

| | | |
|---|---|---|
| 258978 | 3/1988 | European Pat. Off. . |
| 0305185 | 3/1989 | European Pat. Off. . |
| 0428128 | 5/1991 | European Pat. Off. . |
| 61-196551 | 12/1986 | Japan . |
| 63-117355 | 5/1988 | Japan . |
| 56-170837 | 1/1991 | Japan . |

OTHER PUBLICATIONS

Takahashi, et al., "Study on Disk Structures of Magneto-Optical Disc by a Numerical Simulation Method", The Japan Society of Applied Magnetism, 2PB–7, 1988.

*Primary Examiner*—Leszek Kiliman
*Attorney, Agent, or Firm*—Fitzpatrick, Cella Harper & Scinto

[57] ABSTRACT

A magnetooptic recording medium is composed of a transparent substrate, first and second magnetic layers and a reflecting layer. The first magnetic layer is formed on the transparent substrate and exhibits a large magneto-optical effect and has an axis of easy magnetization that is perpendicular to the film surface. The first magnetic layer is made of a Gd—Fe—Co amorphous alloy that is dominant in the iron group sublattice magnetization and the saturation magnetization lies within a range from 50 to 300 emu/cc. The second magnetic layer is formed on the first magnetic layer and has a larger coercive force at the room temperature than that of the first magnetic layer and a Curie temperature or a magnetic compensation temperature lower than that of the first magnetic layer and an axis of easy magnetization that is perpendicular to the film surface. The second magnetic layer is made of an R—Fe—Co amorphous alloy (R is an element of at least one kind of Tb and Dy) that is dominant in the iron group sublattice magnetization and the saturation magnetization lies within a range from 0 to 200 emu/cc. The first and second magnetic layers are exchange-coupled.

9 Claims, 2 Drawing Sheets

MAGNETOOPTIC RECORDING MEDIUM

BACKGROUND OF THE INVENTION

1. Field of the Invention

The invention relates to a magnetooptic recording medium which is used in a magnetooptic disk device or the like and from which information that has been recorded by magneto-optical effect such as magnetic Kerr effect, Faraday effect, or the like can be read out.

2. Related Background Art

Hitherto, in the magnetooptic recording medium, it is difficult to find out a single magnetic material in which a Curie temperature is low, the recording can be easily performed, a coercive force is high, a preservation stability is high, further, a magneto-optical Kerr rotational angle is large, and good reading characteristics are obtained. Therefore, a magnetooptic recording medium in which the necessary functions are separated and two different magnetic materials are laminated has been proposed in U.S. Pat. No. 4,799,114.

FIG. 1 is a schematic cross sectional view of a conventional magnetooptic recording medium using an exchange coupling film. In the diagram, reference numeral 11 denotes an optical transparent substrate made of a glass or plastics. An under layer 12 made of an inorganic dielectric material such as $SiN_x$ or the like to obtain an interference effect and a corrosion preventing effect is provided on the substrate 11. Further, a magnetic layer 13 serving as a reproducing layer and a recording layer 14 having a larger coercive force and a lower Curie temperature than those of the magnetic layer 13 are formed on and over the under layer 12. A dielectric layer 15 made of $SiN_x$ or the like for preventing the corrosion of the magnetic layer and for producing an interference effect is formed on the recording layer. Those films are continuously formed without breaking a vacuum state.

Further, in U.S. Pat. No. 4,753,853, there has been proposed a magnetooptic recording medium which uses a rare earth—iron group amorphous alloy whose iron group sublattice magnetization is dominant as a layer of a high coercive force and which also uses a rare earth—iron group amorphous alloy whose iron group sublattice magnetization is dominant as a layer of a low coercive force and in which the saturation magnetizing directions of both of the alloys are set to be parallel. As a medium having an excellent information stability, a medium using a rare earth—iron group amorphous alloy having a compensation temperature between the room temperature and the Curie temperature as a layer of a high coercive force has been proposed.

In recent years, a recording method which is used in a magnetooptic disk having a large capacity is a method whereby recording mark lengths in the inner periphery and outer periphery of the disk in case of the CAV (Constant Angular Velocity) disk are different. Although a further large capacity is demanded in future, an M-CAV (Modified CAV) method is known as a recording method which can accomplish such a demand. In the M-CAV method, information is recorded by a predetermined mark length, that is, linear velocities or recording frequencies in the inner and outer peripheral portions of the disk are made different. A pit edge recording method whereby information of "0" and "1" are made correspond to the edge portions of the recorded pits has also been proposed.

Although the overwriting function is, further required to improve a data transfer speed, a magnetic field modulation overwriting method is considered to be hopeful as a method which can satisfy such a requirement. In the magazine of The Japan Society of Applied Magnetism, 2PB-7, 1988, there is a report such that in the magnetic field modulation overwriting method, a medium structure having a metal layer such as aluminum or the like having a high heat conductivity has better characteristics such as a C/N ratio and the like.

In the magnetooptic recording medium using two films of the exchange coupling layers which has hitherto been being examined, since a film thickness of magnetic layer is so thick to be a value within a range from 800 to 1000 Å, there are problems such that a heat capacity is large and, in the M-CAV recording mode, in a region of a high linear velocity, a laser power which is necessary in the recording mode is large, so that it is not practical.

To reduce the laser power necessary in the recording mode, it is sufficient to make the film thickness of magnetic layer thin. When the magnetic layer is made thin, however, a new problem such that a magnetooptic signal decreases occurs. In U.S. Pat. No. 4,628,485, therefore, a magnetooptic recording medium in which two exchange coupling layer films are used as magnetic layers and, further, a reflecting film is provided to increase a magneto-optical effect, namely, a Kerr rotational angle has been proposed.

SUMMARY OF THE INVENTION

In the above medium having the reflecting film and two magnetic layers, it is an object of the invention to provide a magnetooptic recording medium from which the recorded information can be read out at a high C/N ratio.

To accomplish the above object of the invention, there is provided a magnetooptic recording medium comprising: a transparent substrate; a first magnetic layer which is provided on the transparent substrate and exhibits a large magneto-optical effect and has an axis of easy magnetization that is perpendicular to a film surface, in which the first magnetic layer is made of a Gd—Fe—Co amorphous alloy that is dominant in the iron group sublattice magnetization and whose saturation magnetization lies within a range from 50 to 300 emu/cc; a second magnetic layer which is provided on the first magnetic layer and has a larger coercive force at the room temperature than that of the first magnetic layer, a lower Curie temperature or magnetic compensation temperature than that of the first magnetic layer, and an axis of easy magnetization that is perpendicular to the film surface, in which the second magnetic layer is made of an R—Fe—Co amorphous alloy (R is at least one kind of elements of Tb and Dy) that is dominant in the iron group sublattice magnetization and whose saturation magnetization lies within a range from 0 to 200 emu/cc and the second and first magnetic layers are mutually exchange-coupled; and a reflecting layer which is provided on the second magnetic layer and is used to reflect a light which has entered from the transparent substrate side and has been transmitted in the first and second magnetic layers.

DETAILED DESCRIPTION OF THE PREFERRED EMBODIMENTS

Figure 1:
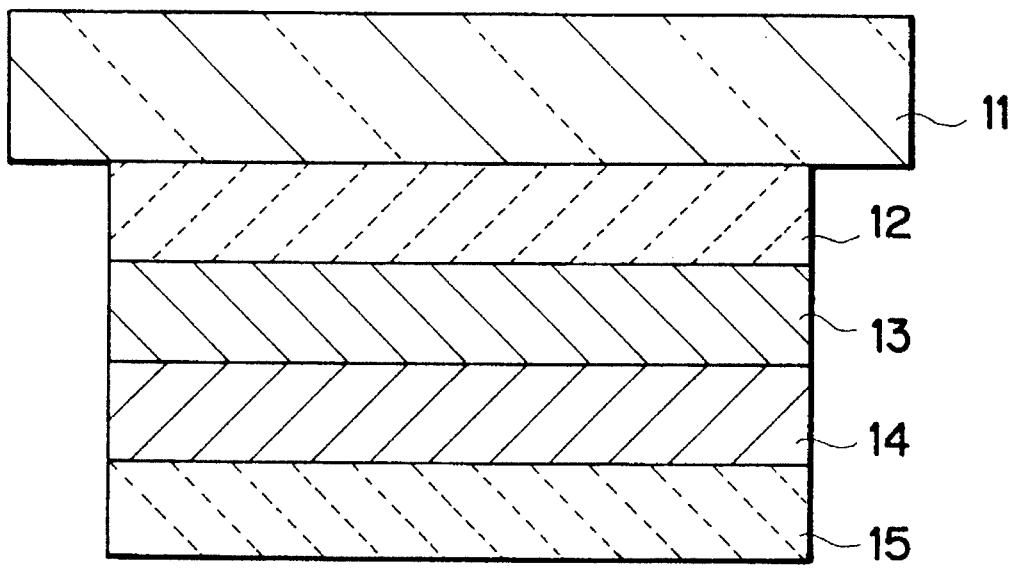
FIG. 1 is a schematic cross sectional view showing an example of a conventional magnetooptic recording medium.
Figure 2:
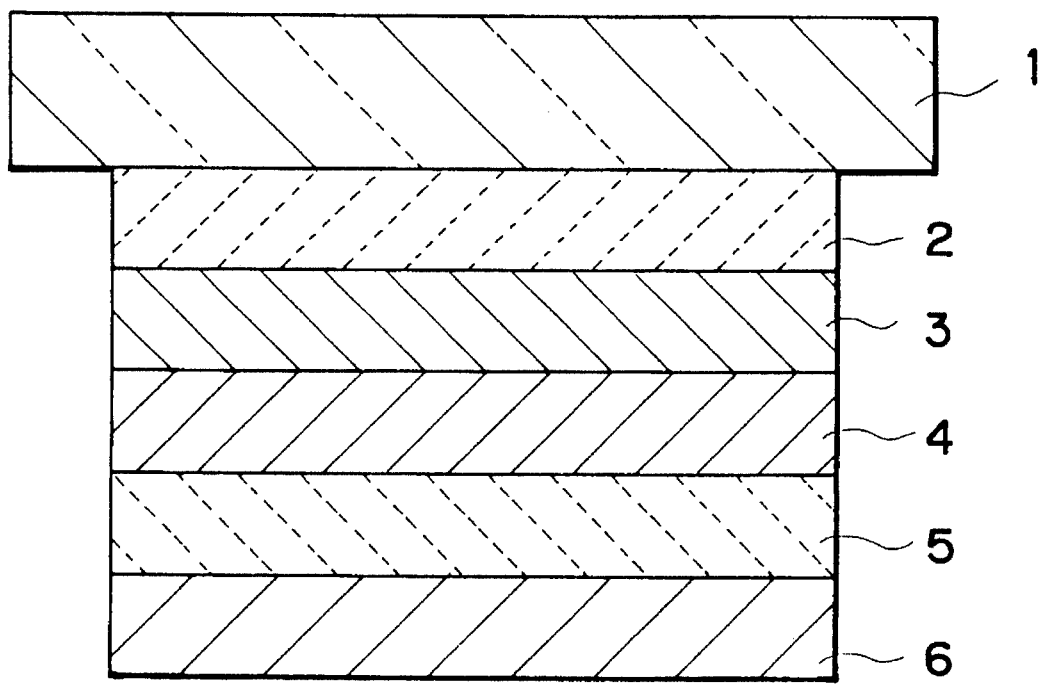
FIG. 2 is a schematic cross sectional view showing an embodiment of a magnetooptic recording medium of the present invention.

An embodiment of the invention will be described in detail hereinbelow with reference to the drawing. FIG. 2 is a schematic diagram showing a construction of an embodiment of a magnetooptic recording medium of the invention. In the diagram, reference numeral 1 denotes an optical transparent substrate made of a glass or plastics. An under layer 2 made of an inorganic dielectric material such as $SiN_x$ or the like to obtain an interference effect and a corrosion preventing effect is provided on the substrate 1. Further, a reproducing layer 3 made of a magnetic film and a recording layer 4 having a larger coercive force at the room temperature and a lower Curie temperature than those of the reproducing layer 3 are formed on and over the under layer 2. A dielectric layer 5 made of $SiN_x$ or the like and a reflecting layer 6 made of a metal are provided on and over the recording layer 4 in order to prevent the corrosion of the magnetic layer and to produce the interference effect. Those films are continuously formed without breaking a vacuum state. The magnetic layer 3 and the recording layer 4 are exchange-coupled.

To increase a recording capacity, it is effective to reduce a pit length. In the magnetooptic recording medium using a disk substrate, the capacity is determined by the shortest pit length in the innermost rim. Therefore, by recording the whole region of the disk by the shortest pit length, an amount of data becomes maximum. Such a method is the M-CAV method. In the M-CAV, since the disk rotational speed is constant, in order to make the pit lengths constant in the whole region of the inner and outer rims of the disk, a modulating frequency of a recording laser in the outer periphery of a high linear velocity must be set to a high frequency. When the recording frequency is raised, the irradiating time of the laser beam obviously becomes short. To form pits, it is necessary to raise a temperature of magnetic film to $T_C$ or higher in the above state and to invert the magnetization. Therefore, when the thickness of magnetic film is thick, the heat capacity is large by an amount corresponding to such a large thickness. In this case, to raise the temperature of magnetic film to $T_C$ or higher, the laser power must be increased by only an amount corresponding to the reduction of the irradiating time. Actually, however, there is a limitation in the power of semiconductor laser. When the magnetic film is thick, accordingly, the recording cannot cope with the M-CAV method. Therefore, according to the medium of the invention, the thickness of magnetic film is made thin and the heat capacity is reduced, thereby decreasing the necessary laser power. When the thickness of magnetic film is made thin, however, the Kerr rotational angle decreases and the light absorbing performance deteriorates. Therefore, by providing a reflecting layer on the side opposite to the light incident side of the magnetic film, the Kerr rotational angle is increased. Further, in order to increase the Kerr rotational angle by using the multiplex interference between the magnetic film and the reflecting layer, a dielectric layer can be also provided between the magnetic film and the reflecting layer. The dielectric layer also has a function to prevent that the heat absorbed in the magnetic layer escapes into the metal layer of the reflecting layer and the recording sensitivity is reduced.

The magnetic characteristics of the two exchange coupling layer films in the case where the magnetic layers are made thin will now be described. When the magnetic layer is made thin, the heat capacity decreases and the sensitivity is improved. However, the Kerr rotational angle decreases. There is, accordingly, a limitation when the thickness of magnetic layer is made thin. In the magnetic films constructing the two exchange coupling layer films, the reproducing layer having a high Curie temperature and a low coercive force will now be described. When the thickness of reproducing layer is smaller than 100 Å, the film is not continuous and the Kerr rotational angle $\theta_k$ extremely decreases and an adequate C/N ratio cannot be obtained. Therefore, the film thickness of reproducing layer needs to be set to 100 Å or more. On the other hand, in the case of the film thickness of recording layer having a low Curie temperature and high coercive force as well, when it is smaller than 100 Å, a magnetic domain is not stably formed, so that the stability of pit and the C/N ratio deteriorate. Therefore, the thickness of recording layer needs to be set to 100 Å or more at which a continuous film can be formed. The total thickness of two magnetic layers, consequently, needs to be set to 200 Å or more.

The maximum film thickness will now be described. When the total film thickness of magnetic layers is equal to or larger than 400 Å, the recording sensitivity deteriorates and the light is not transmitted in the magnetic layers. Accordingly, it is desirable to set the total film thickness of magnetic layers to 400 Å or less.

A composition range of each magnetic layer will now be described.

As a rare earth element of the magnetic layer forming the reproducing layer having the low coercive force and the high Curie temperature, an element in an S state (in the case where it has only a spin angular momentum) such as Gd or the like is used in order to reduce the coercive force. The Curie temperature of Gd—Fe is equal to about 220° C. By further adding Co, the Curie temperature rises and the magneto-optical effect, namely, the Kerr rotational angle increases and the reading characteristics are improved. However, in case of $Gd-(Fe_{100-z}Co_z)$, in a range of Z>30, as a value of Z increases, an iron group magnetic moment decreases and a vertical magnetic anisotropy is reduced. Therefore, Z<50 is desirable.

When the low coercive magnetic layer is dominant in the rare earth class sublattice magnetization, the coercive force of the magnetic layer of a low coercive force increases at temperatures near the Curie temperature of the recording layer of a large coercive force in which information is recorded, so that the recording becomes impossible and such a layer is improper as a recording medium. Therefore, the composition range of the magnetic layer of a low coercive force needs to be set to a range of the iron group sublattice magnetization dominance. As a rare earth class element of the recording layer having a high coercive force, an element in a non-S state (angular momentums include both of a spin angular momentum and an orbit angular momentum: the non-S state corresponds to the case where the angular momentums have both of them) such as Tb, Dy, or the like is used in order to increase the coercive force. The Curie temperatures of Tb—Fe and Dy—Fe are equal to about 130° C. and about 70° C., respectively. By further adding Co, the Curie temperature can be freely controlled. The Curie temperature is concerned with the stability of recording information. As the Curie temperature is high, the stability of recording information is improved but the recording sensitivity deteriorates. A desirable Curie temperature is equal to or higher than 100° C., more preferably, 150° C. or higher. When the Curie temperature is 190° C. or higher, it is undesirable from a viewpoint of the sensitivity. The two exchange coupling layer films are classified into the following two types in accordance with the composition of the recording layer.

(1) P (Parallel) type: in the case where the recording layer is dominant in the iron group sublattice magnetization—the directions of the spontaneous magnetization of both layers are parallel (2) A (antiparallel) type: in the case where the recording layer is dominant in the rare earth class sublattice magnetization—the directions of the spontaneous magnetization of both layers are antiparallel.

In the above two types, according to the invention, by using the composition of the iron group sublattice magnetization dominance as a recording layer, the magnetooptic recording medium having a high magnetic sensitivity and a high C/N ratio in the reading mode is realized.

Further practical examples will now be explained hereinbelow.

EXAMPLE 1

In order to prevent the oxidation and to obtain the interference effect, an under layer having a thickness of 1500 Å and made of $Si_3N_4$, a reproducing layer having a thickness of 100 Å and made of GdFeCo amorphous magnetic alloy film, and a recording layer having a thickness of 100 Å and made of a TbFeCo amorphous magnetic alloy film, and in order to prevent the oxidation and to raise the interference effect, a dielectric layer having a thickness of 400 Å and made of an $Si_3N_4$ film and a reflecting layer made of an Al film are sequentially continuously formed on a polycarbonate substrate with pregrooves having a diameter $\phi$ of 130 mm without breaking the vacuum state by using a magnetron sputtering apparatus, thereby forming the magnetooptic recording medium of the invention.

$Gd_{50}Co_{50}$, Tb, and $Fe_{88}Co_{12}$ are used as targets of the magnetic layers. A GdFeCo film is formed by using the $Gd_{50}Co_{50}$ target and the $Fe_{88}Co_{12}$ target. A TbFeCo film is formed by using the Tb target and the $Fe_{88}Co_{12}$ target. The composition ratios of the rare earth class and the iron group are controlled by changing electric powers which are applied to the $Gd_{50}Co_{50}$ and $Fe_{88}Co_{12}$ targets or to the Tb and $Fe_{88}Co_{12}$ targets. Those films are formed so as to satisfy the conditions of the present invention. In the case of the medium of Example 1, a saturation magnetization $M_S$ of the recording layer is equal to −200 emu/cc and the saturation magnetization $M_S$ of the reproducing layer is equal to −50 emu/cc.

The disk of Example 1 formed as mentioned above is rotated at a rotational speed of 1500 r.p.m., a light beam is irradiated to the position of a radius of 30 mm, and recording and reproducing characteristics are measured. Thus, in case of the medium of Example 1, a recording sensitivity is equal to about 5 mw, a magnetic field sensitivity is equal to 250 Oe, and a reproduction C/N ratio is equal to 46 dB.

Subsequently, by changing the electric powers which are applied to the targets, the magnetooptic recording media which have the same construction as that of Example 1 and in which the saturation magnetizations $M_S$ of the recording layer and reproducing layer exhibit various values are formed. The reproduction C/N ratios and the magnetic field sensitivities of those media are measured by a method similar to Example 1. The results are shown in Tables 1 and 2.

TABLE 1

(C/N ratio)

| | | Saturation magnetization of recording layer (emu/cc) | | | |
|---|---|---|---|---|---|
| | | −250 | −200 | −100 | 0 |
| Saturation magnetization of reproducing layer (emu/cc) | 0 | 36 dB | 42 dB | 42 dB | 38 dB |
| | −50 | 40 dB | 46 dB | 46 dB | 46 dB |
| | −100 | 38 dB | 48 dB | 48 dB | 46 dB |
| | −150 | 36 dB | 47 dB | 47 dB | 46 dB |
| | −200 | 34 dB | 46 dB | 46 dB | 46 dB |
| | −250 | 30 dB | 46 dB | 46 dB | 46 dB |
| | −300 | 20 dB | 46 dB | 46 dB | 46 dB |
| | −350 | 20 dB | 30 dB | 35 dB | 35 dB |

TABLE 2

(Magnetic field sensitivity)

| | | Saturation magnetization of recording layer (emu/cc) | | | |
|---|---|---|---|---|---|
| | | −250 | −200 | −100 | 0 |
| Saturation magnetization of reproducing layer (emu/cc) | 0 | 300 Oe | 350 Oe | 350 Oe | 350 Oe |
| | −50 | 200 Oe | 250 Oe | 250 Oe | 250 Oe |
| | −100 | 150 Oe | 200 Oe | 200 Oe | 250 Oe |
| | −150 | 100 Oe | 150 Oe | 200 Oe | 250 Oe |
| | −200 | 100 Oe | 100 Oe | 200 Oe | 250 Oe |
| | −250 | — | 100 Oe | 200 Oe | 250 Oe |
| | −300 | — | 100 Oe | 150 Oe | 200 Oe |
| | −350 | — | — | — | — |

As will be understood from Tables 1 and 2, when the reproducing layer is dominant in the iron group sublattice magnetization and its saturation magnetization lies within a range from 50 to 300 emu/cc and the recording layer is dominant in the iron group sublattice magnetization and its saturation magnetization lies within a range from 0 to 200 emu/cc, the magnetooptic recording medium having excellent recording and reproducing characteristics in which the reproduction C/N ratio is equal to or larger than 46 dB and the magnetic field sensitivity is equal to or less than 250 Oe is obtained. On the other hand, when the saturation magnetization is out of the above ranges, the reproduction C/N ratio and the magnetic field sensitivity deteriorate.

EXAMPLE 2

In order to prevent the oxidation and to obtain an interference effect, an under layer having a thickness of 1500 Å and made of $Si_3N_4$, a reproducing layer having a thickness of 100 Å and made of a GdFeCo amorphous magnetic alloy film, and a recording layer having a thickness of 100 Å and made of a DyFeCo amorphous magnetic alloy film, and in order to prevent the oxidation and to raise the interference effect, a dielectric layer having a thickness of 400 Å and made of an $Si_3N_4$ film and a reflecting layer made of an Al film are sequentially continuously formed on a polycarbonate substrate with pregrooves having a thickness $\phi$ of 130 mm without breaking the vacuum state by using a magnetron sputtering apparatus, thereby forming the magnetooptic recording medium of the invention.

$Gd_{50}Co_{50}$, Dy, and $Fe_{76}Co_{24}$ are used as targets of the magnetic layers. A GdFeCo film is formed by using the $Gd_{50}Co_{50}$ target and the $Fe_{76}Co_{24}$ target. A DyFeCo film is formed by using the Dy target and the $Fe_{76}Co_{24}$ target.

Composition ratios of the rare earth class and the iron group are controlled by changing electric powers which are applied to the $Gd_{50}Co_{50}$ and $Fe_{76}Co_{24}$ targets or the Dy and $Fe_{76}Co_{24}$ targets and those films are formed so as to satisfy the conditions of the invention. In case of the medium of Example 2, the saturation magnetization $M_S$ of the recording layer is equal to −200 emu/cc and the saturation magnetization $M_S$ of the reproducing layer is equal to −50 emu/cc.

The disk of the embodiment 2 formed as mentioned above is rotated at a rotational speed of 1500 r.p.m., a light beam is irradiated to the position of the radius of 30 mm, and recording and reproducing characteristics are measured. As results, in the case of the medium of Example 2, the recording sensitivity is equal to about 5.5 mw, the magnetic field sensitivity is equal to 200 Oe, and the reproduction C/N ratio is equal to 46 dB.

EXAMPLE 3

The magnetooptic recording medium of the same material and construction as those in the medium of Example 1 is formed except that the film thicknesses of magnetic layers of the reproducing layer and recording layer in Example 1 are set to 100 Å and 200 Å, respectively, and the film thicknesses of $Si_3N_4$ films of the under layer and the interference layer are set to 1100 Å and 300 Å, respectively.

The recording and reproducing characteristics of the disk of Example 3 are measured by a method similar to that in Example 1. Thus, in the case of the medium of Example 3, the recording sensitivity is equal to 5 mw, the magnetic field sensitivity is equal to 200 Oe, and the reproduction C/N ratio is equal to 46 dB.

Comparison 1

The magnetooptic recording medium of Comparison 1 is formed under substantially the same conditions as those in Example 1 except that the TbFeCo film of the recording layer is set be dominant in the rare earth class sublattice magnetization. The saturation magnetization of the reproducing layer of the medium of Comparison 1 is equal to 0 emu/cc and the saturation magnetization of the recording layer is equal to 100 emu/cc.

The recording and reproducing characteristics of the medium of Comparison 1 mentioned above are measured by a method similar to that in Example 1. Thus, in the case of the medium of Comparison 1, the magnetic field sensitivity is equal to 400 Oe and the reproduction C/N ratio is equal to 36 dB.

Subsequently, by changing the electric powers which are applied to the targets, the magnetooptic recording media which have recording layers of the rare earth class sublattice magnetization dominance and in which the saturation magnetizations $M_S$ of the recording layer and reproducing layer exhibit various values are formed in a manner similar to Comparison 1. The reproduction C/N ratios and magnetic field sensitivities of those media are measured by a method similar to that of Example 1. The results are shown in Tables 3 and 4, respectively.

TABLE 3

(C/N ratio)

| | | Saturation magnetization of recording layer (emu/cc) | |
|---|---|---|---|
| | | 100 | 200 |
| Saturation magnetization of reproducing layer (emu/cc) | 0 | 36 dB | 32 dB |
| | −50 | 42 dB | 42 dB |
| | −100 | 45 dB | 42 dB |
| | −150 | 46 dB | 42 dB |
| | −200 | 46 dB | 42 dB |
| | −250 | 46 dB | 42 dB |
| | −300 | 46 dB | 42 dB |
| | −350 | 46 dB | 42 dB |

TABLE 4

(Magnetic field sensitivity)

| | | Saturation magnetization of recording layer (emu/cc) | |
|---|---|---|---|
| | | 100 | 200 |
| Saturation magnetization of reproducing layer (emu/cc) | 0 | 400 Oe | 450 Oe |
| | −50 | 400 Oe | 450 Oe |
| | −100 | 350 Oe | 400 Oe |
| | −150 | 350 Oe | 400 Oe |
| | −200 | 300 Oe | 400 Oe |
| | −250 | 300 Oe | 350 Oe |
| | −300 | 300 Oe | 350 Oe |
| | −350 | 300 Oe | 350 Oe |

As will be understood from Tables 3 and 4, in case of the medium in which the recording layer is dominant in the rare earth class sublattice magnetization, adequate recording and reproducing characteristics are not obtained. For instance, in the case where the saturation magnetization of the recording layer is equal to 100 emu/cc and the saturation magnetization of the reproducing layer lies within a range from 150 to 350 emu/cc, the reproduction C/N ratio is set to 46 dB but the magnetic field sensitivity is equal to or larger than 300 Oe.

Comparison 2

The magnetooptic recording medium of Comparison 2 is formed under substantially the same conditions as those of the medium of Example 1 except that the GdFeCo film of the reproducing layer is set to be dominant in the rare earth class sublattice magnetization. The saturation magnetization of the reproducing layer of the medium of Comparison 2 is equal to 100 emu/cc and the saturation magnetization of the recording layer is equal to 100 emu/cc.

The reproduction C/N ratio of the medium of Comparison 2 mentioned above is measured by a method similar to that of Example 1. Thus, the reproduction C/N ratio of the medium of Comparison 2 is equal to 10 dB.

Comparison 3

The magnetooptic recording medium of Comparison 3 is formed under substantially the same conditions as those of Example 1 except that the GdFeCo film of the reproducing layer and the TbFeCo film of the recording layer are set to be dominant in the rare earth class sublattice magnetization. The saturation magnetization of the reproducing layer of the medium of Comparison 3 is equal to 100 emu/cc and the saturation magnetization of the recording layer is equal to 100 emu/cc.

The reproduction C/N ratio of the medium of Comparison 3 mentioned above is measured by a method similar to that of Example 1. Thus, the reproduction C/N ratio of the medium of Comparison 3 is equal to 10 dB.

The measurement results of the recording and reproducing characteristics of Examples 1 to 3 and Comparisons 1 to 3 are shown in Table 5 in a lump.

TABLE 5

| Recording medium | C/N ratio (dB) | Magnetic field sensitivity (Oe) |
| --- | --- | --- |
| Example 1 | 46 | 250 |
| Example 2 | 46 | 200 |
| Example 3 | 46 | 200 |
| Comparison 1 | 44 | 400 |
| Comparison 2 | 10 | — |
| Comparison 3 | 10 | — |

According to the magnetooptic recording media of the invention as mentioned above, the reproducing layer is made of the Gd—Fe—Co amorphous alloy which is dominant in the iron group sublattice magnetization and whose saturation magnetization lies within a range from 50 to 300 emu/cc and the recording layer is made of the R—Fe—Co amorphous alloy (R is an element of at least one kind of Tb and Dy) which is dominant in the iron group sublattice magnetization and whose saturation magnetization lies within a range from 0 to 200 emu/cc. Therefore, there are advantages such that the magnetic field sensitivity is high and the recorded information can be read out at a high C/N ratio.

What is claimed is:

1. A magnetoopic recording medium for magnetic field modulation overwriting, comprising:

a transparent substrate;

a first magnetic layer, having a thickness of at least 100 Å, which is provided on said transparent substrate, exhibits a large magneto-optical effect, and has an axis of easy magnetization that is perpendicular to a film surface, said first magnetic layer being made of a Gd—Fe—Co amorphous alloy that is dominant in iron group sublattice magnetization and whose saturation magnetization magnitude lies within a range from 50 to 300 emu/cc;

a second magnetic layer, having a thickness of at least 100 Å, which is provided on said first magnetic layer, which has a larger coercive force at room temperature than that of said first magnetic layer and a Curie temperature or a magnetic compensation temperature lower than that of the first magnetic layer, and which has an axis of easy magnetization that is perpendicular to a film surface, said second magnetic layer being made of an R—Fe—Co amorphous alloy, where R includes at least one of Tb and Dy, that is dominant in iron group sublattice magnetization and whose saturation magnetization magnitude lies within a range from 0 to 200 emu/cc, said first and second magnetic layers being mutually exchange-coupled;

a reflecting layer which is provided on said second magnetic layer and is used to reflect a light which has entered said medium from the transparent substrate side and has been transmitted through said first and second magnetic layers; and wherein the combined film thickness of said first and second magnetic layers is 400 Å or less.

2. A medium according to claim 1, wherein said medium has a reproduction C/N ratio of 46 dB or more and a magnetic field sensitivity of 200 Oe or less.

3. A medium according to claim 1, further comprising a dielectric layer provided between said second magnetic layer and said reflecting layer.

4. A medium according to claim 1, wherein said reflecting layer is made of Al.

5. A medium according to claim 1, wherein said second magnetic layer has a Curie temperature within a range from 100° to 190° C.

6. A medium according to claim 3, wherein said dielectric layer is made of $SiN_x$.

7. A medium according to claim 3, further comprising a dielectric layer provided between said transparent substrate and said first magnetic layer.

8. A medium according to claim 5, wherein said second magnetic layer has a Curie temperature within a range from 150° to 190° C.

9. A medium according to claim 7, wherein said dielectric layer is made of $SiN_x$.

* * * * *

UNITED STATES PATENT AND TRADEMARK OFFICE
CERTIFICATE OF CORRECTION

PATENT NO. : 5,547,773
DATED : August 20, 1996
INVENTOR(S) : TOSHIMORI MIYAKOSHI It is certified that error appears in the above-indentified patent and that said Letters Patent is hereby corrected as shown below:

ON THE COVER PAGE

[56] References Cited

FOREIGN PATENT DOCUMENTS:

"56-170837 1/1991 Japan" should read --56-170837 1/1981 Japan--.

[57] ABSTRACT

Line 20, "exchange-coupled." should read --exchange-coupled. The reflecting layer is formed on the second magnetic layer and is used to reflect the light which has entered from the substrate side and has been transmitted in the first and second magnetic layers.--

COLUMN 1:

Line 65, "is," should read --is--.

COLUMN 7:

Line 44, "set" should read --set to--.

UNITED STATES PATENT AND TRADEMARK OFFICE
CERTIFICATE OF CORRECTION

PATENT NO. : 5,547,773
DATED : August 20, 1996
INVENTOR(S) : TOSHIMORI MIYAKOSHI It is certified that error appears in the above-indentified patent and that said Letters Patent is hereby corrected as shown below:

COLUMN 9:

Line 35, "magnetoopic" should read --magnetooptic--.

Signed and Sealed this

Twenty-fifth Day of March, 1997

*Attest:*

BRUCE LEHMAN

*Attesting Officer*  Commissioner of Patents and Trademarks